April 27, 1954    W. B. GRIFFITH ET AL    2,676,794
OVERLOAD SPRING
Filed June 12, 1950
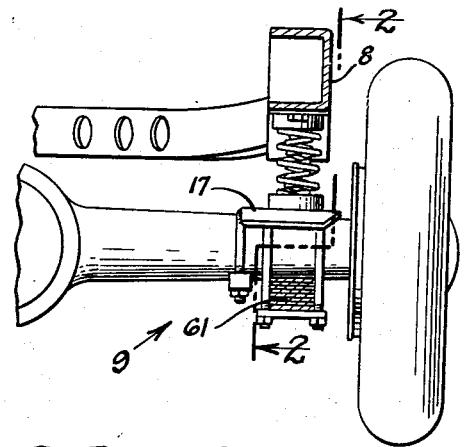
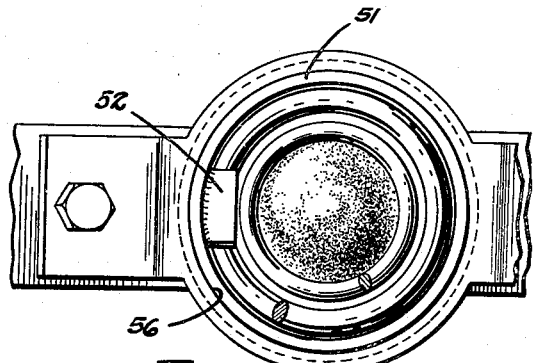
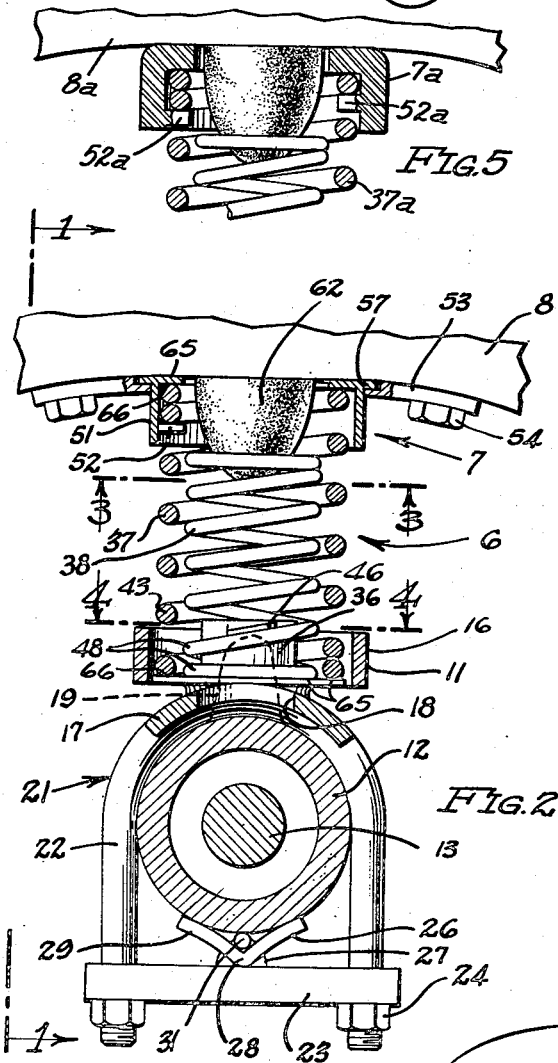
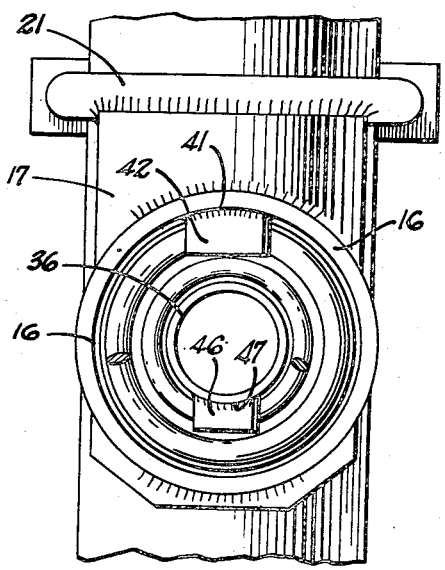
WELLINGTON B. GRIFFITH
NORA I. GRIFFITH
INVENTORS.
BY
ATTORNEY Patented Apr. 27, 1954

2,676,794

UNITED STATES PATENT OFFICE 2,676,794

OVERLOAD SPRING

Wellington B. Griffith and Nora I. Griffith,
El Monte, Calif.

Application June 12, 1950, Serial No. 167,616

9 Claims. (Cl. 267—28)

1

This invention relates to an auxiliary, or overload spring for a vehicle of the type wherein the body is spring-supported upon an axle or axle housing.

An object of our invention is to provide a spring of suitable dimensions and means for mounting the spring in operative position interposed between the body or frame of a passenger automobile, station wagon, or light truck and the rear axle housing thereof so it operates in conjunction with the conventional body-supporting springs and consequently increases the effective load which the vehicle can receive with safety.

A more detailed object is to provide a novel and unusually efficient device for mounting the overload spring in operative position, which mounting means constitutes an independent unit to which the spring element of my invention can be attached after the mounting unit is secured in position, and from which the spring element is readily disengageable without the necessity of removing or even loosening the mounting unit, thus adapting a vehicle equipped with the overload spring of our invention for ready adjustment optionally for condition of normal loading, or for loading in excess of the normal or safe capacity of the vehicle's standard spring equipment.

With this object in view, the overload spring of the present invention is especially designed for, although it is not necessarily limited to, installation and use upon a passenger automobile frequently employed in towing a trailer, a portion of the weight of which is imposed upon the towing vehicle when hitched thereto. When the trailer is in use, the spring element of the device of the present invention can be left in operative position, to aid the towing vehicle's springs in supporting the front end of the trailer; but when the towing vehicle is to be used without the trailer, the spring element can be removed, thus permitting the car's springs to function normally and without interference with the car's easy riding characteristics under conditions of normal loading.

A further object of our present invention is to provide, in an overload spring accessory of the general type indicated, in which a dual, coil spring arrangement is employed, wherein one spring remains in operation at all times when the spring element is in operating position, but wherein the second spring becomes operative only when the first mentioned spring has been compressed a predetermined amount. Accordingly, even when the overload spring is in operating position, only a minimum of interference with

2 normal action of the car's conventional springs is offered, and yet when unusually heavy loading conditions are experienced, or when an unusually bad bump is encountered in the path being traversed by the car, the second spring automatically comes into action to help support the load and to prevent excessive distortion and/or "bottoming" of the car's standard springs.

Yet another object is to provide improvements in the construction of the mounting unit of the device, which enhance both the ease with which it may be secured in position upon the vehicle and with which the spring element may be attached thereto and removed therefrom as occasion demands, and also the security with which the mounting unit remains fixed in proper, operating position against accidental dislodgement therefrom as from shock, vibration, and the like.

The invention possesses other objects and features of advantage, some of which, with the foregoing, will be set forth in the following description of the preferred forms of our invention which are illustrated in the drawings accompanying and forming part of the specification. It is to be understood that we do not limit ourselves to the showing made by the said drawings and description, as we may adopt variations of the preferred forms within the scope of our invention as set forth in the claims.

Referring to the drawings:

Figure 1 is a view in rear elevation of an overload and stabilizer auxiliary spring construction incorporating the principles of the present invention and shown mounted in operative position in association with the frame and rear axle housing for an automobile. This view may be considered as a sectional view taken transversely of the automobile upon the line 1—1 of Figure 2, with the direction of view as indicated.

Figure 2 is a compound vertical sectional view, drawn to a large scale, of the overload and stabilizer auxiliary spring of Figure 1, the planes of section being indicated by the lines 2—2 of Figure 1 and the direction of view by the arrows.

Figure 3 is a horizontal sectional view taken upon the line 3—3 of Figure 2, with the direction of view as indicated.

Figure 4 is a horizontal sectional view taken on line 4—4 of Figure 2.

Figure 5 is a detail view of the upper portion of a slightly modified form of construction.

The overload and stabilizer auxiliary spring of the present invention is illustrated in Figures 1 to 4, inclusive, as comprising a spring unit 6, an upper mounting unit 7 for connecting the upper end of the spring unit 6 to the under side of a frame member 8 of a conventional passenger automobile 9 (although it is to be understood that the overload spring of the present invention is equally well adapted for use in conjunction with a station wagon or light truck) and a lower mounting unit 11 for securing the lower end of the spring unit 6 to the housing 12 of the rear axle 13 of the automobile 9.

First describing the lower mounting unit 11, Figure 2 most clearly illustrates this portion of the device as comprising a cup 16 opening upwardly and the bottom of which is preferably only partly closed by a transversely arcuate saddle plate 17. Preferably, this saddle plate 17 is provided with a central aperture 18 through which the conventional solid rubber bumper dog indicated in broken lines at 19 is adapted to extend, thus avoiding the necessity of removing the bumper dog 19 when mounting the cup 16 in operative position upon the upper side of the rear axle housing 12. Secured to the saddle plate 17, as by welding preferably, at or adjacent one end thereof as illustrated in Figure 1, is a U-bolt 21. The spaced, parallel legs 22 of the U-bolt 21 embrace the rear axle housing 12 and extend downwards therepast far enough to receive a clamping strap 23 upon their lower ends, this strap being provided with clearance holes through which the lower ends of the legs 22 extend so as to receive therebelow nuts 24 which are threaded upon the lower ends of the legs 22. To the upper face of the strap 23 a short length of angle iron 26 is secured, as by welding 27. This angle iron 26 is disposed in position extending parallel to the rear axle 13 and with its center portion or angle 28 engaging the upper face of the clamp 23 and with the two flanges 29 extending obliquely upward therefrom at substantially equal angles. This permits the curved under surface of the rear axle housing 12 to enter the space above and between the two flanges 29; and since the angle iron 26 is composed of relatively soft, or "malleable," iron, it is subject to being readily deformed as the nuts 24 are tightened, forcing the under surface of the housing 12 deeper into the space between the flanges 29. In this way, the angle iron is caused to conform to the configuration of the housing 12 and thereby establish a better fit and correspondingly increased security of the clamp 23. This protects the U-bolt 21 and cup 16 against accidental dislodgement from proper, operative position due to shock, vibration, or the like. However, in order to insure against impairment of security of the engagement between the angle iron 26 and the housing 12, I prefer to provide a block or rod 31, preferably solid, permanently secured inside the angle iron 26 closely adjacent the angle portion 28 thereof against which the housing 12 impinges when the operation of tightening the clamp 23 has been carried far enough to attain the greatest degree of security and rigidity.

Also secured to the upper surface of the saddle plate 17 is a central boss member 36 rigid with and disposed co-axially within the cup 16.

The spring unit 6 comprises an outer coil spring 37 and an inner coil spring 38, the lower ends of both of which are disposed within the cup 16. The boss 36 extends upwards within the interior of the smaller coil spring 38 whereas the lower end of the larger coil spring 37 fits loosely within the cup 16 with the result that the two springs 37 and 38 are retained substantially co-axially with respect to each other.

Means are provided for releasably anchoring the lower end of each spring 37, 38 to the cup 16 and to the boss 36 respectively. Secured as by welding 41 (see Figure 4) to the inner surface of the cup 16 is a finger 42 preferably in the form of a relatively narrow flat plate welded along its outer edge to the inner surface of the cup 16, and extending radially inwards far enough to be received between two of the lower whorls 43 of the outer spring 37.

In order to facilitate reception of the plate-like finger 42 between these whorls 43 it preferably is secured within the cup 42 at an angle from the horizontal substantially corresponding to the pitch of the spring. The parts are so proportioned and arranged that the lower end of the spring 37 can be received within the cup 16 by first tipping the spring toward that side thereof with which the anchoring finger 42 is to be associated and then inserting the lowermost side of the bottom end of the spring into the cup past the inner end of the finger 42. When the advancing end of the spring engages the bottom of the cup it should be slid radially upwards causing the finger 42 to enter the space between whorls 43 of the spring, then may be straightened to stand erect within the cup. The spring then should be rotated about its own axis until the lowermost whorl 43 engages the under surface of the finger with sufficient firmness to retain the spring securely in position standing erect within the cup 16.

The lower end of the inner or smaller spring 38 is similarly secured in position by means of a similar plate-like anchoring finger 46 secured as by welding 47 to the outer surface of the boss 36 and extending radially outward therefrom to be received between the whorls 48 adjacent the lower end of the inner spring 38.

The upper mounting unit 7 also comprises a cup 51 which in this instance is unmounted so as to open downwards. This unmounted cup 51 is secured to the under surface of a longitudinally extending frame member 8 in axial alignment with the lower cup 11 so as to adapt it to receive the upper end of the larger or outer spring 37. Here again fastening means are preferably provided in the form of a plate-like angularly disposed finger 52 adapted to be received between adjacent whorls 43 of the spring 37 near or at its upper end. Preferably, the cup 51 is secured to the under surface of the frame member 8 by means of a plate 53 fastened to the frame member 8 as by cap screws 54 or similar fastening devices. This plate 53 is provided with an opening 56 through which the cup 51 extends downwards from the plate 53; but this opening 56 is of smaller diameter than a flange 57 rigid with and extending radially outward from the cup 51 adjacent its base with the result that the plate 53 serves to anchor the cup 51 securely in position, as clearly shown in Figure 2. However, by loosening the two cup screws 54, the cup 51 may be rotated after the upper end of the spring 37 has been seated therein, thus permitting the finger 52 to be brought firmly into engagement with the under surface of the whorl 43 immediately thereabove and thereby secure the upper end of the spring 37 within the cup in such a manner as to prevent rattling.

Preferably, the inner spring 38 is shorter than the outer spring 37, with the result that it remains inoperative when the spring 37 is only partially compressed, but when more than the usual load is imposed upon the spring 37, or when an unusually severe bump is encountered in the path being traversed by the vehicle, causing the spring 37 to be compressed to a greater degree, the frame member 8 or the bottom of the cup 51 will engage the upper end of the inner spring 38 which then becomes operative in resisting further compression of the spring 37; hence, the inner spring 38 permits carrying even greater overloading in the vehicle without unduly straining the springs 61 with which the automobile is equipped at the factory. However, since the inner spring 38 is inoperative when the outer spring 37 is only partially compressed, it does not impair the easy loading characteristics of the vehicle during the normal conditions of overloading. Furthermore, when no overloading whatsoever, or when slight loading in excess of that for which the vehicle was originally designed are to be experienced, both springs 37 and 38 may readily be removed without requiring dislodgement of either of the cups 51 or 16. This is accomplished by lifting the body of the vehicle as by means of a jack until the vehicle's springs 61 are substantially completely relaxed. This will lower the upper end of the inner spring 38 considerably below the lower end of the bumper dog 62 which extends downwards from the frame member 8 far enough to aid in holding the upper end of the spring 38 co-axially with respect to the outer spring 37. Such raising of the body also places the outer spring 37 in tension with the result that when the cap screws 54 are loosened sufficiently to permit rotation of the cup 51, the finger 52 may be loosened from the whorl 43 with which it has been firmly engaged and the center portion of the spring 37 may then be flexed far enough to disengage that whorl from the finger 52, permitting the upper end of the spring 37 to drop out of the cup 51. Both springs 37 and 38 may then be manipulated in such a manner as to release their lower ends from the fingers 42 and 46 respectively so that the springs may be completely removed and the vehicle then operated without any impairment of the normal easy riding characteristics of its conventional, factory equipped springs 51. Reinsertion of the springs 37 and 38 into operative association with the cups 16 and 51 is accomplished in the reverse manner.

It is noted that the end turns of each of the coil springs extend transversely to the axis of the springs rather than at the pitch angle of the spring, to thus present end faces 65 extending directly transversely of the axis of the springs for engaging transverse shoulders 66 of the cups. As will be appreciated, the provision of such interengaging transverse shoulders on the springs and cups is important in attaining an effective rotative wedging of the springs into tight engagement with the cups between the cup shoulders and retaining fingers.

Fig. 5 shows a modified type of upper cup 7a, which is not attached to but merely bears upwardly against the frame member 8a. Cup 7a has a pair of integral lugs or projections 52a corresponding to projection 52 of Fig. 2 and received between successive turns of the spring 37a to releasably attach the cup to the spring. Lugs 52a are typically formed at diametrically opposite locations, and are axially offset in correspondence with the pitch of the spring.

We claim:

1. In an overload and stabilizer auxiliary spring for a vehicle having an axle housing and a frame spring-supported thereabove, a cup, means for mounting said cup upon said axle housing in position opening toward said frame, a pair of coil springs disposed one inside the other and each having one end seated within said cup and extending therefrom toward said frame, said cup having an outer wall extending about the end of an outer one of said springs and an inner wall extending along the inside of a corresponding end of the inner spring, a finger projecting inwardly from said outer wall between the turns of said outer spring to releasably mount it within the cup, and a second finger projecting outwardly from said inner wall between turns of the inner spring to releasably attach it to the cup.

2. In an overload and stabilizer auxiliary spring for a vehicle having an axle housing member and a frame member spring-supported thereabove, a pair of cups, means for mounting one of said cups upon said housing member in position opening toward said frame member, means for mounting the other of said cups on said frame member in co-axial alignment with and opening toward said housing-mounted cup, at least one of said cup-mounting means comprising a flange extending radially outwards from the associated cup and a plate engaging the outer face of said flange and having an aperture through which said associated cup extends, and means for securing said plate to one of said members, a coil spring having its ends seated in said cups, and means for releasably securing each of said spring ends within its associated cup, each of said securing means comprising a finger rigid with the associated cup and extending radially inwards from the side wall thereof into the space between whorls of said coil spring.

3. In an overload and stabilizer auxiliary spring for a vehicle having an axle housing and a frame spring-supported thereabove, a coil spring interposed between said frame and said housing, a cup having the end of said coil spring proximal to said housing seated therein and means for securing said cup rigidly to said housing comprising a saddle plate fastened to the bottom of said cup, a U-bolt embracing said housing and fastened to said saddle plate, a clamping strap having spaced holes therein through which the legs of said U-bolt extend slidably, nuts threaded on said legs and engaging the outer face of said strap, and a piece of angle iron fastened at its angle to the inner face of said strap with both its flanges extending at oblique angles therefrom and embracing between said flanges the curved side of said housing opposite the side thereof engaged by said saddle plate, said angle iron being deformable as said nuts are tightened by pressure of said housing thereagainst.

4. In an overload and stabilizer auxiliary spring for a vehicle having an axle housing and a frame spring-supported thereabove, a coil spring interposed between said frame and said housing, a cup having the end of said coil spring proximal to said housing seated therein and means for securing said cup rigidly to said housing comprising a saddle plate fastened to the bottom of said cup, a U-bolt embracing said housing and fastened to said saddle plate, a clamping strap having spaced holes therein through which the legs of said U-bolt extend slidably, nuts threaded on said legs and engaging the outer face of said strap, a piece of angle iron fastened at its angle to the inner face of said strap with both its flanges extending at oblique angles therefrom and embracing between said flanges the curved side of said housing opposite the side thereof engaged by said saddle plate, said angle iron being deformable as said nuts are tightened by pressure of said housing thereagainst, and means for limiting entry of said housing into the space between said flanges of said angle iron.

5. In an overload and stabilizer auxiliary spring for a vehicle having an axle housing and a frame spring-supported thereabove, a coil spring interposed between said frame and said housing, a cup having the end of said coil spring proximal to said housing seated therein and means for securing said cup rigidly to said housing comprising a saddle plate fastened to the bottom of said cup, a U-bolt embracing said housing and fastened to said saddle plate, a clamping strap having spaced holes therein through which the legs of said U-bolt extend slidably, nuts threaded on said legs and engaging the outer face of said strap, a piece of angle iron fastened at its angle to the inner face of said strap with both its flanges extending at oblique angles therefrom and embracing between said flanges the curved side of said housing opposite the side thereof engaged by said saddle plate, said angle iron being deformable as said nuts are tightened by pressure of said housing thereagainst, and a nondeformable block fastened to the inner face of said angle iron at the angle thereof for limiting entry of said housing into the space between said flanges of said angle iron.

6. An overload spring unit for a vehicle having an axle housing member and a frame member spring-supported thereabove, a coil spring to extend vertically between said members, a cup receiving one end of said spring and acting against one of the members, said cup having a shoulder against which said end of the spring bears, and means for releasably securing said spring end within the cup, said means including a finger carried by and projecting inwardly from a side wall of said cup at a location spaced from said shoulder and received between successive turns of the spring, said finger being of a length to extend only partially across said cup, the interior of said cup being free of any obstruction to movement of the spring directly axially thereinto except near the location of said finger, whereby the spring may be inserted into the cup by first tilting the spring, then moving one of its sides laterally into interfitting engagement with the finger, and then moving the opposite side of the spring into the cup.

7. An overload spring unit as recited in claim 6, in which an end turn of said spring is formed to present an end face extending directly transversely of the axis of the spring, and in which said cup shoulder extends directly transversely of said spring axis for circularly extended engagement with said face.

8. In an overload and stabilizer auxiliary spring for a vehicle having an axle housing and a frame spring-supported thereabove, a coil spring interposed between said frame and said housing, a cup having the end of said coil spring proximal to said housing seated therein and means for securing said cup rigidly to said housing comprising a saddle plate fastened to the bottom of said cup, a U-bolt embracing said housing and fastened to said saddle plate, a clamping strap having spaced holes therein through which the legs of said U-bolt extend slidably, nuts threaded on said legs and engaging the outer face of said strap, and a pair of walls carried by and projecting from the inner face of said strap and diverging at an angle to embrace therebetween the curved side of said housing opposite the side thereof engaged by said saddle plate, said walls being deformable as said nuts are tightened by the pressure of said housing thereagainst.

9. In an overload and stabilizer auxiliary spring as recited in claim 8, including means between said walls limiting the movement of said housing into the space between the walls.

References Cited in the file of this patent

UNITED STATES PATENTS

| Number | Name | Date |
|---|---|---|
| 153,353 | Leitzell | July 21, 1874 |
| 436,320 | Stevens | Sept. 9, 1890 |
| 1,300,658 | Sebastian | Apr. 15, 1919 |
| 1,486,295 | Mullen | Mar. 11, 1924 |
| 2,209,632 | Martin | July 30, 1940 |
| 2,466,384 | Cook | Apr. 5, 1949 |
| 2,521,546 | Siesholtz | Sept. 5, 1950 |

FOREIGN PATENTS

| Number | Country | Date |
|---|---|---|
| 8,083 | Great Britain | July 30, 1908 |